United States Patent [19]
Dubay et al.

[11] Patent Number: 5,848,807
[45] Date of Patent: Dec. 15, 1998

[54] FRAME CONSTRUCTION

[75] Inventors: Gregory H. Dubay, Morris; Michael V. Dziubinski, Darien; Paul M. Ives, Channahon; Clifford E. Miller, Marseilles, all of Ill.

[73] Assignee: Caterpillar Inc., Peoria, Ill.

[21] Appl. No.: 827,288

[22] Filed: Mar. 28, 1997

[51] Int. Cl.⁶ .................................................. B62D 21/00
[52] U.S. Cl. ........................ 280/781; 280/785; 280/504; 180/311; 180/312; 296/204
[58] Field of Search ......................... 180/311, 312, 180/418; 280/781, 785; 296/204; 244/117 R, 119, 124, 131, 132; 52/653.1, 656.2, 479, 786.1; D12/159; D25/48, 52, 61

[56] References Cited

U.S. PATENT DOCUMENTS

D. 251,741   5/1979   Smallwood et al. ................ D25/52
D. 255,838   7/1980   Emanuel ............................. D25/48
D. 350,400   9/1994   De Block ........................... D25/52

*Primary Examiner*—Robert J. Oberleitner
*Assistant Examiner*—Tyrone M. Lee
*Attorney, Agent, or Firm*—William C. Perry; John J. Cheek

[57] ABSTRACT

The frames of many construction machines comprise a complex compilation of fabricated sections or massive cast members that are not necessarily intended to handle a specific type of loading applied to the frame assembly. The present invention provides a frame construction that includes a pair of laterally spaced plate members. Each plate member has a first end portion constructed of a substantially solid plate. A second end portion of the plate members define at least one opening that provides an integral portion of a beam assembly. The first end portion is positioned in the frame construction to accommodate a first type of loading, while the second end portion is located in an area to accommodate a second type of loading.

24 Claims, 2 Drawing Sheets

Fig_1_

FRAME CONSTRUCTION

TECHNICAL FIELD

This invention relates to a frame construction and more particularly to the frame construction of a construction machine.

BACKGROUND ART

Construction machines of all types necessarily require a main frame for the machine that will be able with withstand extremely high forces. These forces are not only generated from the movement of the machine over uneven and often times rugged terrain, but also from operational forces of the various implements that are available for operation on certain types of machines. Many of the construction machines are of the articulated variety and have a front frame that mounts one or more of a variety of work implements and one or more axles, and a rear frame that mounts an engine, at least one axle and the associated drive train, and possibly one or more work implements. The frames are pivoted together about a vertical pivot axis and rotate or "articulated" with respect to one another to provide steering to the machine. A pair of steering cylinders are positioned to extend between the frame members and extension and retraction of the cylinders causes on frame to be rotated, or steered, with respect to the other.

All these components impart various types of loading to the frame members from all angles. It is necessary therefore, to design a frame to accommodate these various types of loading. A problem arises in the design of such a frame in providing adequate support for the most severe areas of loading while not over designing those areas of the frame that will not be subjected to such severe forces. Typically, this has been done by fabricating a frame structure of several box sections that are welded together, each section having the necessary dimensions to accommodate the required loading. This requires a tremendous amount of welding that in many instances, is both difficult and expensive to do. Other methods require members made of cast pieces that are also expensive and often times do not provide the required flexibility to properly accommodate the various types of loading applied to various portions of the frame.

The present invention is directed to overcoming one or more of the problems as set forth above.

DISCLOSURE OF THE INVENTION

In one aspect of the present invention, a frame construction is disclosed that includes a plate member that has a first and second end portion. The second end portion is positioned to extend laterally from the first end portion. The first end portion of the plate member is constructed of a substantially solid plate that has a preselected thickness. The second end portion defines at least one opening that extends therethrough. The opening extends substantially along the entire length and height of the second end portion. A pair of cover plates are adapted for positioning and securement to opposite sides of the second end portion of the plate member. The cover plates are secured to the respective side portions in overlying relationship to the opening and define a substantially hollow beam on the second end portion of the plate member.

In another aspect of the present invention, a frame construction is adapted for use in a frame assembly. The frame assembly includes a pair of plate assemblies that are positioned in laterally spaced parallel relationship to one another. Each plate assembly has a first end portion defined by a plate member that is constructed of a substantially solid plate portion. A second end portion of each plate member extends laterally from the respective first end portions and defines a hollow beam member. A hitch assembly is positioned between and connected to the first end portions of the plate assemblies and a brace member is positioned between and is connected to the second end portions of the respective first and second plate assemblies.

With a frame construction as set forth above, portions of the frame members may be selectively positioned within the frame construction for their capability to accommodate specific types of loads. The solid portion of the frame members may be positioned in an area requiring greater mass to accommodate specific loads from the hitch and axle assemblies of a machine. Alternatively, the beam portion of the frame members may be positioned in areas requiring more flexibility to accommodate torsional-type loading that may be applied thereto by any one of a number of components mounted on the machine.

BEST MODE FOR CARRYING OUT THE INVENTION

Figure 1:
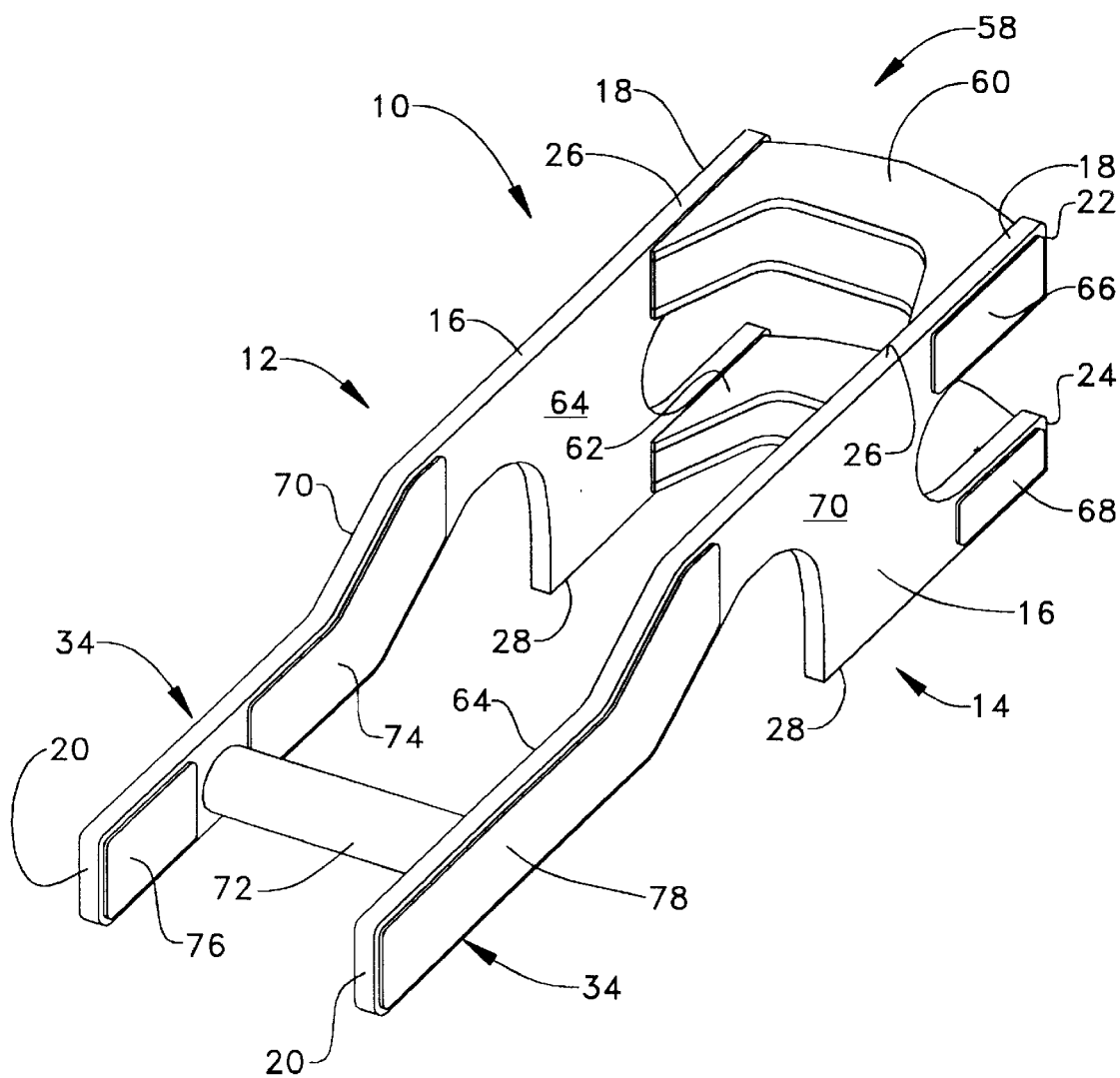
FIG. 1 is a diagrammatic isometric view of a frame construction that embodies the principles of the present invention.
Figure 2:
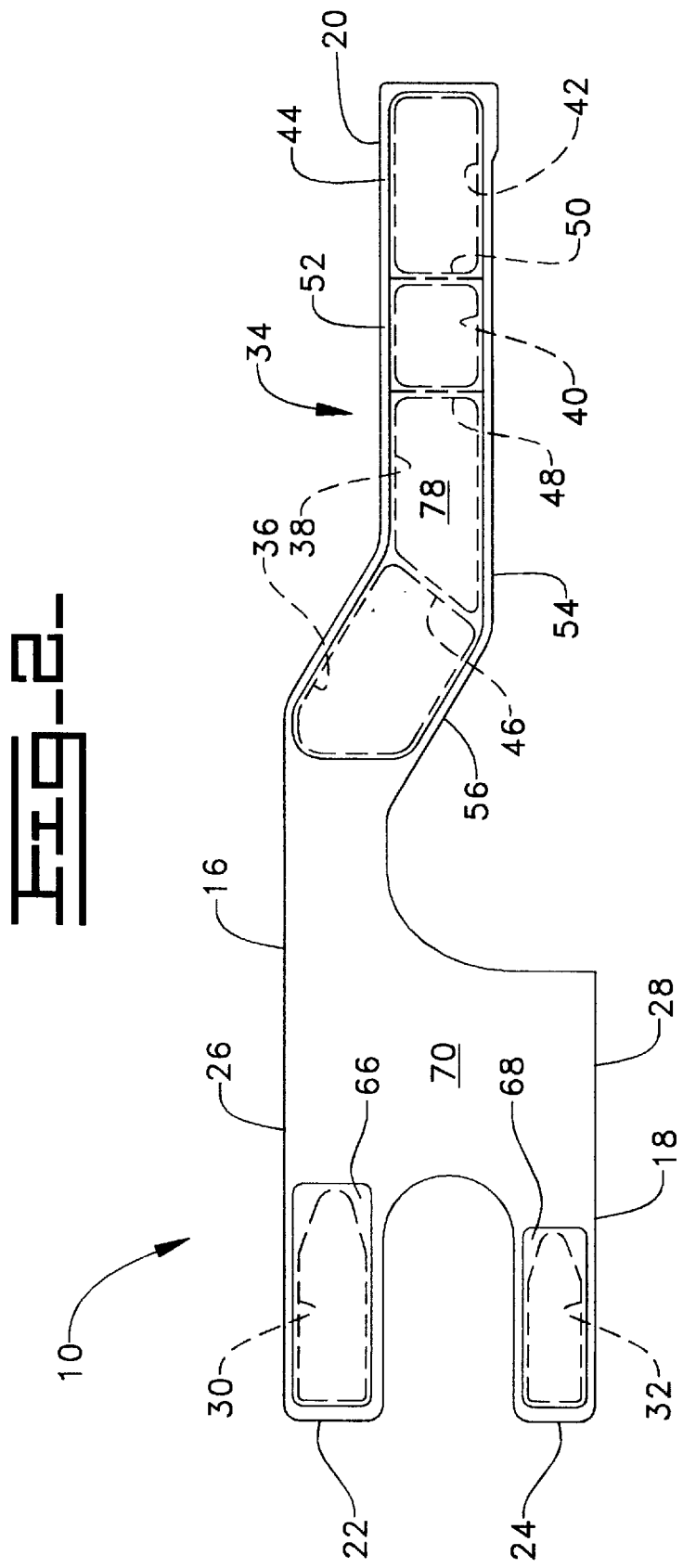
FIG. 2 is a diagrammatic side view of the frame construction shown in FIG. 1 showing on of the main plate members that are incorporated in the frame construction.

Turning now to the drawings, it can be seen that a frame construction is shown generally at 10. The frame construction includes a pair of plate assemblies 12 and 14 that are secured together in laterally spaced, parallel relationship to one another. Each plate assembly is identical in construction and therefore only one will be described in detail, it being understood that the reference numeral will apply to both plate assemblies.

Each plate assembly 12 and 14 includes a plate member 16 that has a first end portion 18 and a second end portion 20. The first end portion 18 is bifurcated to define a pair of vertically spaced arms 22 and 24 that extend along an upper and lower extremity 26 and 28 respectively. The first end portion is comprised of a substantially solid plate having a preselected thickness of approximately 80 mm. A pair of openings 30 and 32 are defined in each of the upper and lower arms 22 and 24, respectively, and extend substantially the entire length and width of the arms.

The second end portion 20 of each plate member 16 defines a substantially hollow beam assembly 34. The second end portion 20 of each plate member extends laterally from the first end portion 18 and defines a plurality of openings 36, 38, 40 and 42. The openings extend substantially the entire length and width of the second end portion, leaving only the surrounding peripheral portion 44, having a relatively small wall thickness, to border the openings. The openings are separated by a plurality of web members 46, 48 and 50 that provide some degree of structural support between the upper and lower runs 52 and 54 respectively, of the peripheral wall sections of the second end portion 20. While the instant embodiment is shown as having a plurality of four openings positioned therealong, it is to be understood that more or less openings could be provided without departing from the intent of the subject invention. The second end portion 20 is joined to the first end portion 18 along an angled connecting portion 56. Web member 46 is angled and extends between the upper and lower peripheral portions 52 and 54 to provide support along the angled portion 56 and to isolate opening 36 within the angled connecting portion 56. The angled connecting portion 56 extends downwardly to position the second end portion 20 approximately midway between the upper and lower extremities 26 and 28 defined by the first end portion 18. The overall height of the second end portion 20 is shown to be approximately half that of the first end portion 18, however the relative proportions may change depending upon the application of the frame assembly.

A hitch assembly 58 is positioned between the respective first end portions 18 of each plate member 16. An upper hitch portion 60 extends between the upper arms 22 in overlying relationship to the opening 30, while a lower hitch portion 62 extends between the lower arms 24, also in overlying relationship to the opening 32. The hitch assembly 58 is secured, as by welding, to a first or inner side 64 of each plate member 16. An upper and lower arm cover plate 66 and 68 respectively, are secured in overlying relationship to the openings 30 and 32 to a second, or outer side 70 of each plate member.

A brace member 72 extends between the second end portions 20 of each plate member 16 and is secured in any suitable fashion such as welding, to the first side 64 of each plate member. The brace member is positioned to overlie the opening 40 defined by the second end portion 20 of each plate member.

A first cover plate 74 is positioned in overlying relationship to the openings 36, and 38 defined by the second end portion 20 of each plate member 16. The first cover plate 74 (FIG. 1) is secured by welding to the first side 64 of the plate member so as to be positioned immediately adjacent the brace member 72. A second cover plate 76 is positioned in overlying relationship to opening 42 and is also welded to the first side 64 of the plate member. The second cover plate 76 is positioned on the opposite side of the brace member from the first cover plate 74 so that the cover plates and the brace member combine to overlie all of the openings 36, 38, 40 and 42. A third cover plate 78 is also sized to cover all of the openings and is welded to the outer side 70 of the plate members. Each of the cover plates 74, 76 and 78 are substantially thinner than the respective plate members, having a thickness of approximately 12 mm. Being so configured, the cover plates combine with the second end portion 20 to form a beam assembly 34 that is relatively flexible compared to the solid plate configuration that defines the first end portion 18 of the respective plate members.

Industrial Applicability

During the fabrication of the frame assembly as set forth above, each plate member 16 is comprised of a single, solid plate section that is approximately 80 mm thick. Once the outline of each plate member has been established, they are positioned on a burn table, or similar manufacturing apparatus, and the openings 36, 38, 40 and 42 are cut into the second end portion 20 thereof, leaving the web members 46, 48, and 50 positioned between the openings. The third cover plates 78 are welded to the outer sides 70 of the respective plate members and the first and second cover plates 74 and 76 are welded to the inner sides 64 thereof as is the brace member 72. The hitch assembly 58 is secured to the inner sides 64 of first end portions 18 of the respective plate members 16 while the upper and lower arm plate covers 66 and 68 are secured to the outer sides 70 of the respective arm portions 22 and 24 to substantially complete the construction of the frame assembly.

The frame construction 10 is adapted to be pivotally connected to another frame member (not shown) in the area of the hitch assembly 58 as well to mount a pair of hydraulic cylinders (not shown) in the area between the bifurcated arms 22 and 24 and toward the second end portion 20 of the plate members 16. The hydraulic cylinders extend between the two frames to provide relative movement therebetween. An axle assembly (not shown) is also mounted to the frame construction in the vicinity of the first end portion thereof 18.

On opposite end of the frame assembly, in the area of the second end portions 20 of the plate members 16, a work implement (not shown) is typically secured to the brace member 72. The work implement typically is of the variety such as a ripper mechanism that engages the ground in a way that tends to transmit torsional loading to the second end portion 20 of the frame construction 10.

With the frame construction 10 as set forth above, the plate assemblies 12 and 14 are constructed in a manner wherein the solid, or first end portion of the plate members 16 are positioned in the area of the frame construction to accommodate the loading from the hitch, the steering cylinders and the axle assembly. This is an area that requires the considerable structural capacity provided by the solid plate construction of the first end portions 18 of the plate members. Alternatively, the second end portions 20 of the plate members 16 are defined by a beam assembly 34 that is much more flexible than the first end portion. The flexibility provided by the second end portion is critical in accommodating the type of torsional loads applied to the frame construction 10 by the operation of the work implement. The construction of the plate members 16 provides accommodation for both types of loading and yet may be fabricated in a very efficient, cost effective manner.

Other aspects, objects and advantages of this invention can be obtained from a study of the drawings, the disclosure and the appended claims.

We claim:

1. In a construction machine having a frame and a ground-engaging implement, the improvement wherein said frame comprises:

a plate member having a first end portion and a second end portion extending laterally from the first end portion, said first end portion of the plate member comprising a substantially solid plate having a preselected thickness and the second end portion defining at least one opening therethrough, said opening extending substantially along the entire length and height of the second end portion; and a pair of cover plates adapted for positioning on opposite sides of the second end portion of the plate member and being secured thereto in overlying relation to said at least one opening to define a substantially hollow beam on said second end portion.

2. The improvement as set forth in claim 1 wherein the first end portion of the plate member defines a pair of bifurcated arms that are spaced elevationally from one another.

3. The improvement as set forth in claim 2 wherein an opening is positioned in each of said bifurcated arms and extends, substantially along the entire length and height thereof.

4. The improvement as set forth in claim 1 wherein a plurality of web members are positioned in said opening to divide the opening into a plurality of sections.

5. The improvement as set forth in claim 1 wherein the first end portion of the plate member has a preselected overall height and the second end portion has an overall height that is less than one half of said preselected height.

6. The improvement as set forth in claim 1 wherein the preselected thickness of the plate member is approximately 80 mm.

7. The improvement as set forth in claim 1 wherein the cover plates have a thickness of approximately 12 mm.

8. The improvement as set forth in claim 1 wherein the first end portion of the plate member defines and upper and lower extremity and the second end portion is positioned elevationally between said extremities.

9. The improvement as set forth in claim 1 wherein the second end portion of the plate member extends from an upper portion of the first end portion along an angled connecting portion.

10. The improvement as set forth in claim 9 wherein an angled web member is positioned in the opening defined by the second end portion of the plate member to separate the opening into a first opening portion positioned in the angled connecting portion and a second opening in the laterally extending portion of the second end portion.

11. The improvement as set forth in claim 1 wherein a plurality of web members are spaced along the opening defined by the second end portion of said plate member to divide the opening into a plurality of segments.

12. A frame construction adapted for use in a frame assembly, comprising:

first and second plate assemblies, each having a first end portion defined by a plate member comprising a substantially solid first end portion and a second end portion extending laterally from the first end portion, said second end portion of each plate member defining a substantially hollow beam member, said plate assemblies being positioned in laterally spaced, parallel relationship to one another;

a hitch assembly positioned between and connected to first end portions of the respective first and second plate assemblies; and a brace member positioned between and connected to the second end portions of the respective first and second plate assemblies.

13. The frame construction as set forth in claim 12 wherein the first end portion of each plate assembly is bifurcated to define respective upper and lower arms that are vertically spaced from one another.

14. The frame construction as set forth in claim 13 wherein an opening is provided in each of said bifurcated arms and extends substantially along the entire length and height thereof, and wherein the hitch assembly defines an upper hitch portion that extends between the upper arms of the first end portions of the respective plate assemblies in overlying relationship to the openings in each upper arm portion.

15. The frame construction as set forth in claim 13 wherein an opening is provided in each of said bifurcated arms and extends substantially along the entire length and height thereof, and wherein the hitch assembly defines a lower hitch portion that extends between the lower arms of the first end portions of the respective plate assemblies in overlying relationship to the openings in each lower arm portion.

16. The frame construction a set forth in claim 12 wherein the second end portion of each plate assembly is substantially equal in length to that of the first end portion.

17. The frame construction as set forth in claim 12 wherein said second end portion of each of the plate members defines a opening that extends therethrough and substantially extends along the entire length and height thereof, and for each plate member, said frame construction further comprises:

a first cover plate having a size sufficient for covering a first selected portion of the opening defined in the second end portion of the plate member and being secured to a first side of the plate member in overlying relationship to a portion of the opening at a location adjacent the brace member, a second cover plate having a size sufficient for covering a second selected portion of the opening defined in the second end portion of the plate member and being secured to the first side of the plate member in overlying relationship to a portion of the opening at a location adjacent the brace member opposite that of the first cover plate; and a third cover plate having size sufficient for covering the entire opening defined in the second end portion of the plate member and being secured to a second side of the plate member opposite said first side thereof in overlying relationship to said opening.

18. The frame construction as set forth in claim 17 wherein the opening defined in the second end portion of the plate member has a plurality of web members extending between an upper and lower surface of the opening to divide the opening into a plurality of segments.

19. A frame construction, comprising:

a plate member having a first end portion and a second end portion extending laterally from the first end portion, said first end portion of the plate member comprising a substantially solid plate having a preselected thickness and the second end portion defining at least one opening therethrough, said opening extending substantially along the entire length and height of the second end portion, said first end portion of said plate member defining a pair of bifurcated arms that are spaced elevationally from one another; and a pair of cover plates adapted for positioning on opposite sides of the second end portion of the plate member and being secured thereto in overlying relation to said at least one opening to define a substantially hollow beam on said second end portion.

20. The frame construction as set forth in claim 19 wherein an opening is positioned in each of said bifurcated arms and extends, substantially along the entire length and height thereof.

21. A frame construction, comprising:

a plate member having a first end portion and a second end portion extending laterally from the first end portion, said first end portion of the plate member being constructed of a substantially solid plate having a preselected thickness and the second end portion defining at least one opening therethrough, said opening extending substantially along the entire length and height of the second end portion, said first end portion having a preselected overall height and the second end portion having an overall height that is less than half of said preselected height; and a pair of cover plates adapted for positioning on opposite sides of the second end portion of the plate member and being secured thereto in overlying relation to said at least one opening to define a substantially hollow beam on said second end portion.

22. A frame construction, comprising:

a plate member having a first end portion and a second end portion extending laterally from the first end portion, said first end portion of the plate member being constructed of a substantially solid plate having a preselected thickness and the second end portion defining at least one opening therethrough, said opening extending substantially along the entire length and height of the second end portion, said first end portion defining an upper and lower extremity and said second end portion being positioned elevationally between said extremities; and a pair of cover plates adapted for positioning on opposite sides of the second end portion of the plate member and being secured thereto in overlying relation to said at least one opening to define a substantially hollow beam on said second end portion.

23. A frame construction, comprising:

a plate member having a first end portion and a second end portion extending laterally from the first end portion and connected thereto by an angled connecting portion, said first end portion of the plate member being constructed of a substantially solid plate having a preselected thickness and the second end portion defining at least one opening therethrough, said opening extending substantially along the entire length and height of the second end portion; and a pair of cover plates adapted for positioning on opposite sides of the second end portion of the plate member and being secured thereto in overlying relation to said at least one opening to define a substantially hollow beam on said second end portion.

24. In a construction machine comprising a frame assembly and a ground-engaging implement, the improvement wherein said frame assembly comprises the frame construction recited in claim 12.

* * * * *